United States Patent [19]

Bishop

[11] Patent Number: 4,820,140

[45] Date of Patent: Apr. 11, 1989

[54] SELF-LUBRICATING ROTARY VANE PUMP

[75] Inventor: Jerry B. Bishop, Wichita, Kans.

[73] Assignee: Sigma-Tek, Inc., Augusta, Kans.

[21] Appl. No.: 112,485

[22] Filed: Oct. 26, 1987

[51] Int. Cl.$^4$ .................. F04C 18/344; F04C 29/00; F16C 33/24

[52] U.S. Cl. ................... 418/152; 418/178; 418/179; 384/279; 384/298; 384/300

[58] Field of Search .............. 418/152, 178, 179; 384/279, 298, 300, 912

[56] References Cited

U.S. PATENT DOCUMENTS

| | | |
|---|---|---|
| Re. 26,088 | 9/1966 | Rulon-Miller et al. . |
| Re. 27,028 | 1/1971 | Ely, Jr. et al. . |
| 2,995,462 | 8/1961 | Mitchell et al. ............ 384/300 |
| 3,013,967 | 12/1961 | Rulon-Miller et al. . |
| 3,053,593 | 9/1962 | Blair et al. ................ 384/300 |
| 3,145,735 | 8/1964 | Osrow et al. . |
| 3,191,852 | 6/1965 | Kaatz et al. . |
| 3,193,190 | 7/1965 | Lindberg . |
| 3,196,194 | 7/1965 | Ely, Jr. et al. . |
| 3,286,913 | 11/1966 | Kaatz et al. . |
| 3,304,216 | 2/1967 | Eggleton . |
| 3,304,221 | 2/1967 | Eggleton . |
| 3,325,842 | 6/1967 | Spencer . |
| 3,338,805 | 8/1967 | Pachily et al. . |
| 3,379,135 | 4/1968 | Kaatz . |
| 3,398,884 | 8/1968 | Kaatz et al. . |
| 3,445,552 | 5/1969 | Aungst et al. . |
| 3,453,359 | 7/1969 | Clement et al. . |
| 3,500,870 | 3/1970 | Ely, Jr. et al. . |
| 3,552,895 | 1/1971 | Bayley ..................... 418/178 |
| 3,565,558 | 2/1971 | Tobacman . |
| 3,619,455 | 11/1971 | Clement et al. . |
| 3,652,409 | 3/1972 | Mack et al. . |
| 3,674,733 | 7/1972 | Ayella . |
| 3,766,031 | 10/1973 | Dillon . |
| 3,908,704 | 9/1975 | Clement et al. . |
| 4,119,324 | 10/1978 | Denton et al. . |
| 4,171,561 | 10/1979 | Bainard et al. . |
| 4,239,243 | 12/1980 | Bainard et al. . |
| 4,258,927 | 3/1981 | Cather, Jr. . |
| 4,276,007 | 6/1981 | Sakamaki et al. ............ 418/152 |
| 4,294,074 | 10/1981 | Striebich . |
| 4,362,480 | 12/1982 | Suzuki et al. ............... 418/178 |
| 4,406,847 | 9/1983 | O'Neal et al. . |
| 4,582,368 | 4/1986 | Fujita et al. ............... 384/300 |

FOREIGN PATENT DOCUMENTS 2074247 10/1981 United Kingdom ............... 418/178

*Primary Examiner*—John J. Vrablik
*Attorney, Agent, or Firm*—Harold E. Meier

[57] ABSTRACT

The invention comprises a rotary pump with sliding vanes with a self-lubricating solid coating covering the exterior end facing surfaces of the rotor and end facing surfaces of air transfer end plates. Additionally disclosed herein is a rotary pump with sliding vanes with a pair of bushings centrally located in the rotor with the internal bearing facing surfaces of the bushings covered with a self-lubricating solid coating.

1 Claim, 1 Drawing Sheet

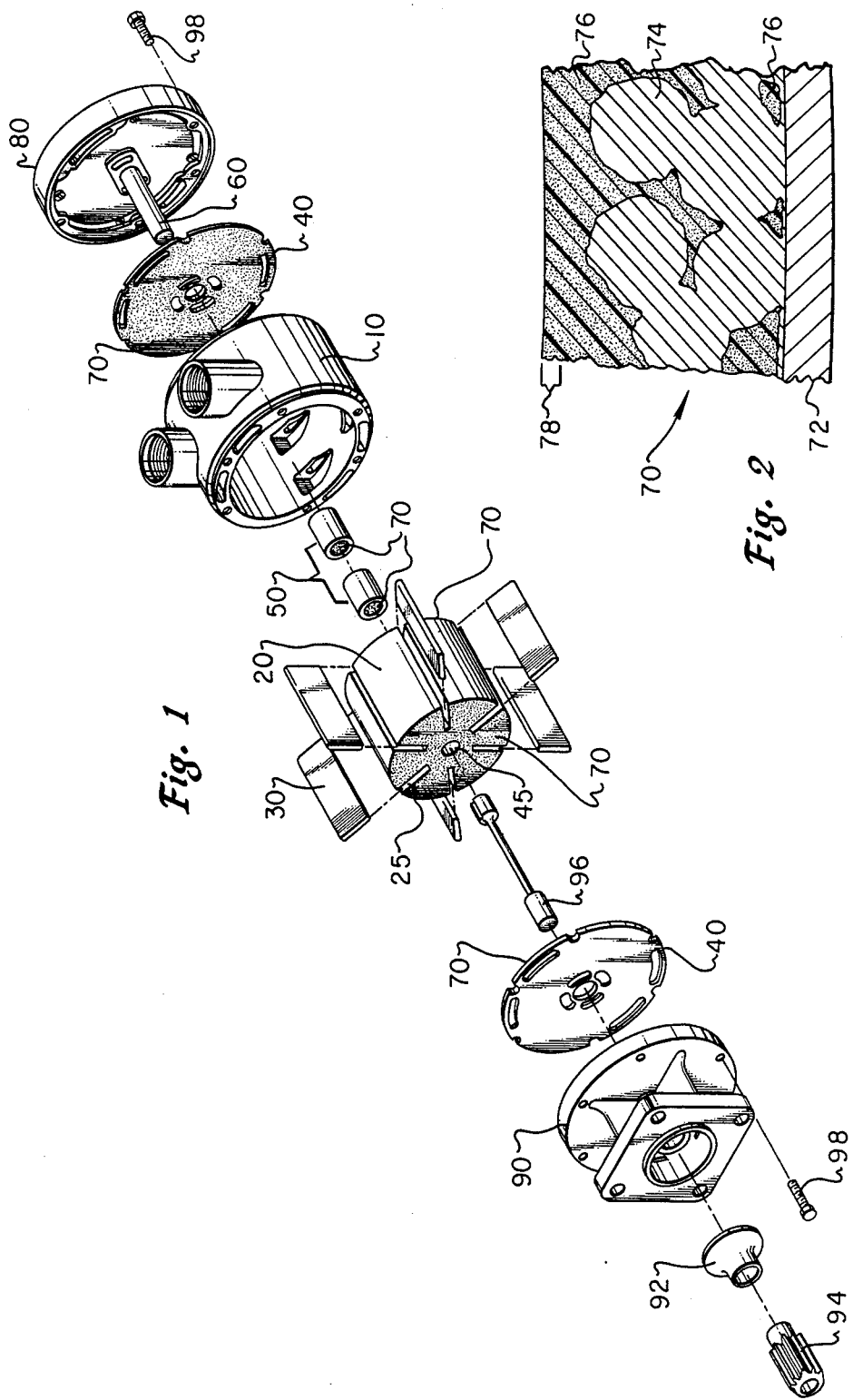

SELF-LUBRICATING ROTARY VANE PUMP

TECHNICAL FIELD

The present invention relates to rotary pumps with sliding vanes, and more particularly relates to a self-lubricating coating which provides for long term use while inhibiting wear between the rotor and vanes.

BACKGROUND AND SUMMARY

Sliding vane rotary pumps have a multitude of mechanical and industrial applications and as such are subject to a wide range of environmental conditions. More specifically, sliding vane rotary pumps are used in aircraft which subjects the pumps to severe atmospheric conditions having widely varying partial pressures of natural film-forming atmospheric constituents such as water vapor and oxygen. This causes the pumps to experience undue wear and thus greatly shortens their operating life.

Previously, mechanical carbon parts such as disclosed in U.S. Pat. No. 3,191,852 to Kaatz et al. issued June 29, 1965, which are normally formed of powdered graphite and carbon with a suitable binder, have been employed in aircraft.

These carbon parts have proved to be less than satisfactory as wear continues to occur due to the frictional contact between the relatively moveable parts when operated under the above-described atmospheric conditions. This places some limits on the operating life of such pumps.

In addition, the fragile nature of such carbon parts occasionally results in their chipping or fracture when in use, thereby requiring the pump to be repaired at frequent intervals.

The present invention comprises a rotary pump with sliding vanes which overcomes the foregoing disadvantages of the prior art. More specifically, the disclosed sliding vane rotary pump has a self-lubricating solid coating covering the exterior end facing surfaces of the rotor and end facing surfaces of the air transfer end plates. In addition, there is an internal pair of bushings centrally located in the rotor, whose bearing facing surfaces are covered with a self-lubricating solid coating.

Moreover, the self-lubricating solid coating is of a type of composition which alleviates the need of using the heretofore carbon parts.

As such, a pump constructed to include the present invention is capable of long-term use while inhibiting wear between the rotor and vanes even under the divergent atmospheric conditions of varying partial pressures such as encountered in aircraft operations.

BRIEF DESCRIPTION OF DRAWINGS

A more complete understanding of the invention and its advantages will be apparent from the detailed description taken in conjunction with the accompanying drawings in which:

FIG. 1 is an exploded perspective view of the invention.

FIG. 2 is a sectional view of one of the embodiments of the coating of the invention.

DETAILED DESCRIPTION

Referring initially to FIG. 1, the metallic liner 10 is shown as encasing the rotor 20, which has a series of radial vane slots 25. A plurality of vanes 30 are slideably disposed in the radial vane slots 25. The vanes 30 engage the metallic liner 10. A pair of stationery air transfer end plates 40 are disposed with interior surfaces facing the end surfaces of the rotor 20 transversely to its axis of rotation. The rotor 20 contains a central bore 45 into which a pair of metallic cylindrical bushings 50 are centrally located. The bushings 50 have an internal bearing surface in contact with the exterior surface of a shaft 60 which slides into the bushings 50.

A coating 70 covers the interior surfaces of the air transfer end plates 40, the end facing surfaces of the rotor 20, and the internal bearing surface of the metallic cylindrical bushings 50.

Metallic liner 10 is further fastened to a rotor support 80, located posteriorly to the metallic liner 10 and to a mounting flange 90 located anteriorly to the rotor 20. The mounting flange 90 has assembled therein an oil slinger 92 and a drive spline 94, both of which connect to a pencil drive shaft 96 which, in turn, is connected in any well known manner to rotor 20 for providing rotary power.

The various components are attached by means of a plurality of taptite screws 98.

Now referring to FIG. 2, there is shown a cross section of one of the embodiments of the coating 70 which covers the end surfaces of the rotor 20, the interior surfaces of the air transfer end plates 40 and the bearing surface of the metallic cylindrical bushings 50.

The illustrated coating 70 of a predetermined thickness has a metallic interface 72 which is contiguous with the surface of the particular pump component covered, i.e. either the rotor 20, air transfer end plate 40 or cylindrical bushing 50. The metallic interface 72 serves as a substrate for a porous powdered bronze innerstructure layer 74, which overlays the metallic interface 72. The innerstructure layer 74 has a homogeneous mixture of lead and polytetrafluoroethylene 76 interspersed throughout the innerstructure layer 74.

A surface layer 78 consisting of a homogeneous mixture of lead and polytetrafluoroethylene, identical in composition to the homogeneous mixture of lead and polytetrafluoroethylene 76 interspersed throughout the innerstructure layer, overlays the innerstructure layer 74.

Another embodiment of the coating 70 occurs when the above metallic interface 72 of FIG. 2 is an aluminum oxide with surface asperities which are impregnated with a polytetrafluoroethylene polymer. This possible embodiment of the coating 70 may also have an innerstructure layer 74, a homogeneous mixture of lead and polytetrafluoroethylene 76, and a surface layer 78.

While certain embodiments of the present invention have been described in detail herein and shown in the accompanying drawings, it will be evident that various further modifications are possible without departing from the scope of the invention.

I claim:

1. A rotary pump comprising: a metallic liner, a cylindrical rotor of a material having properties substantially similar to aluminum, the rotor including a plurality of radial vane slots therein and having end facing surfaces, a plurality of vanes slidably disposed in said slots and engaging said liner, a pair of stationary air transfer end plates disposed facing the end facing surfaces of said rotor transversely to its axis of rotation, a pair of metallic cylindrical bushings centrally located in said rotor with an internal bearing surface and a shaft having an exterior surface facing the internal bearing surfaces of said cylindrical bushings, the improvement which comprises:

a self-lubricating, solid coating of predetermined thickness covering the exterior end facing surfaces of said rotor, end facing surfaces of said air transfer end plate, and internal bearing surfaces of said cylindrical bushings; wherein the self-lubricating, solid coating of predeterined thickness covering the exterior end facing surfaces of said rotor comprises an aluminum oxide layer with surface asperities impregnated with a polytetrafluoroethylene polymer; wherein the selflubricating, solid coating of predetermined thickness covering the end facing surfaces of said air transfer end plates comprises a metallic interface contiguous with a porous, powdered bronze innerstructure layer with a homogeneous mixture of lead and polytetrafluoroethylene interspersed throughout the innerstructure layer; and wherein the self-lubricating, solid coating of predetermined thickness covering the internal bearing surfaces of said metallic cylindrical bushings comprises a metallic interface contiguous with a porous, powdered bronze innerstructure layer with a homogeneous mixture of lead and polytetrafluoroethylene interspersed throughout the innerstructure layer and a surface layer consisting of a homogeneous mixture of lead and polytetrafluoroethylene overlaying the innerstructure layer.

* * * * *